3,464,772
METHOD AND APPARATUS FOR TESTING THE VISUAL PROPERTIES OF PIGMENTED LIQUIDS
Ian H. Day, Southall, England, assignor to Polymark Limited
Filed Aug. 4, 1966, Ser. No. 570,247
Claims priority, application Great Britain, Aug. 9, 1965
33,947/65, Patent 1,085,595
Int. Cl. G01n 21/06
U.S. Cl. 356—208      5 Claims

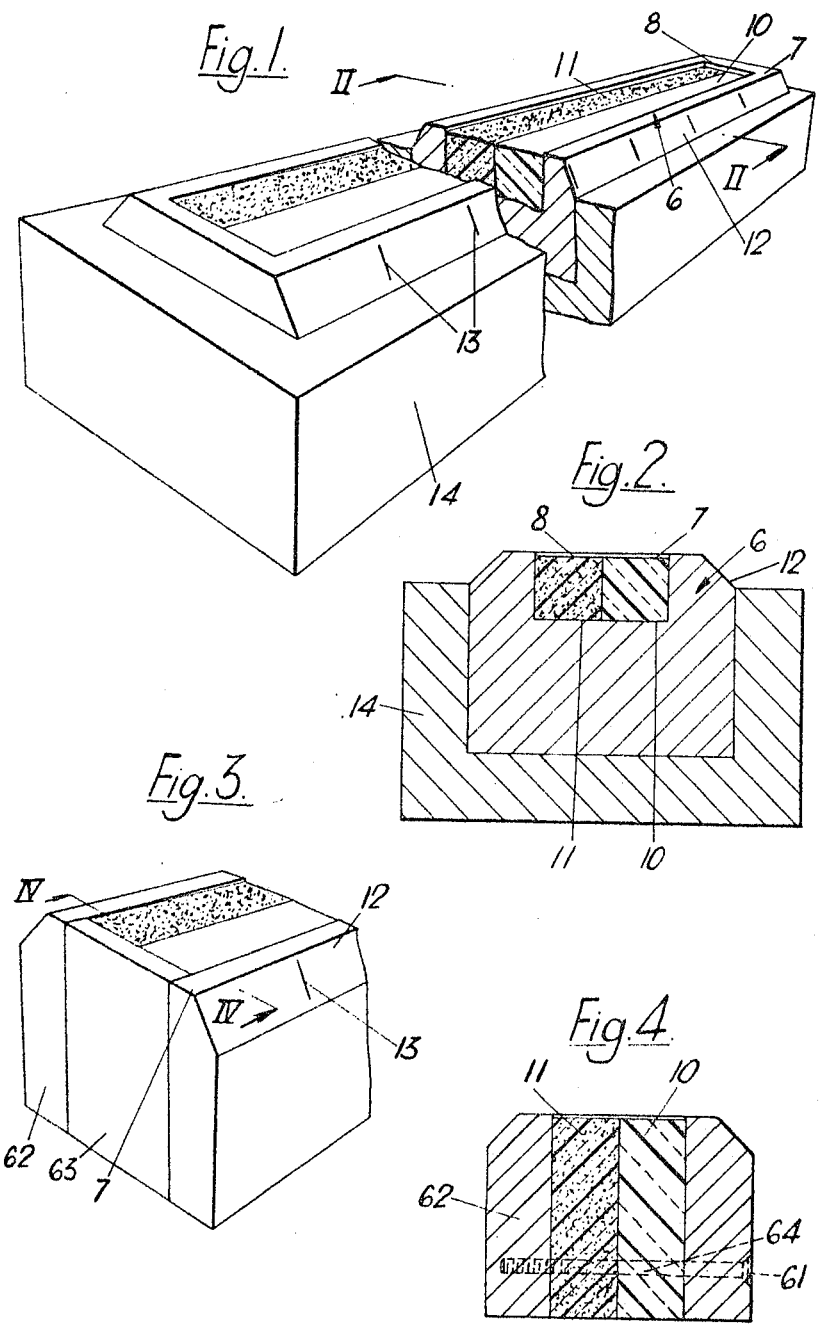

ABSTRACT OF THE DISCLOSURE

A method and apparatus is disclosed for testing the visual properties or opaqueness of pigmented liquids. This is accomplished by spreading a liquid sample in an open inclined channel of progressively decreasing depth, the channel having zones of contrasting appearance disposed lengthwise in the bottom thereof. Upon inspection of the sample in the channel without any contact with the exposed surface of the sample in the channel; and under reference illumination conditions a point along the channel will be observed where the contrasting zones become insignificant, this point representing specific visual properties.

---

The present invention relates to testing or comparing the visual properties of spreadable materials, and is particularly directed to a testing method and apparatus suitable for a simple and easily made comparison test of such materials suitable for production use.

In various industries, for example in the paint making and ink making industries, it is necessary to meet certain requirements as to the appearance of coated or printed materials.

More particularly the invention is directed to assessing the properties which may be generally referred to as the "opacity" of spreadable materials, this term being used to cover those visual properties which are often important in industries concerned with coating materials and including, for example, the "covering power" of paint and like compositions.

Thus, the present invention is concerned in many cases but not exclusively with flowable or spreadable liquid or viscous liquids containing pigments, although may be applied to assessing the optical density of relatively transparent layers containing dyestuffs.

In assessing the particle size in pigment bearing coating materials the "fineness of grind" gauge has been used which comprises a channel in a hardened steel block the channel being of varying accurately known depth and receives in use a small quantity of ink to be tested which is spread along the channel from the deep end towards the shallow end by means of a spreader blade. This enables the pigment size to be observed by noting the position at which the individual pigment particles can be seen; this point representing the depth of the channel and thus the thickness of the layer and being co-related to the particle size.

A method for testing the visual properties of spreadable materials according to the invention comprises distributing a sample quantity of such material to progressively increasing depth in a channel having zones of contrasting appearance disposed lengthwise thereof, noting the position at which distinction between the appearance of the zones becomes insignificant under reference ilumination conditions, and utilising the depth of the channel at said position as an indication of such properties.

Apparatus according to the invention comprises a gauge body having a surface part bounding a channel of progressively varying depth, the base of which channel includes surfaces of contrasting appearance so that a portion of material spread into said channel by a spreader means engaging the said surface part provides a progressively varying depth of such material and the position along the gauge body at which there is insignificant distinction between the said zones is representative of the thickness of the coated layer at that point and of the said visual properties.

More specifically apparatus according to the present invention comprises a channel having a base surface including zones of contrasting appearance and a boundary edge serving as a guide for spreading means, to form a coating of known progressively varying thickness within the channel, such boundary edge being calibrated in units representing the depth of the channel.

In the preferred embodiments of the invention the apparatus comprises an elongated channel the base of which is formed by light colour and dark colour strips or zones extending side-by-side lengthwise of the channel, the channel being of progressively increasing depth from one end of the device to the other.

In most cases the range of depth may be between 0 and 0.25 mm., although the range need not start at zero and could be, for example, between 0.01 mm. and 0.25 mm. These figures are appropriate for the testing and comparing of paint and ink compositions, but may have other values for apparatus designed for testing the opacity or transmission of other liquids.

Several embodiments according to the present invention are illustrated by way of example on the accompanying drawings in which:

FIG. 1 is a general view in perspective showing the gauge,

FIG. 2 is a section on the line II—II in FIG. 1,

FIG. 3 is a partial view illustrating a second embodiment of the invention, and

FIG. 4 is a section on the line IV—IV of FIG. 3.

The gauge apparatus shown on the accompanying drawings comprises an elongated block 6 of a suitable hard metal, preferably stainless steel, having a ground upper surface 7 providing a rectangular framework bounding a channel 8 which is adapted to receive contrastingly coloured strips 10, 11 formed of a light coloured or white material and a dark coloured or black material respectively. The upper surfaces of the strips 10 and 11 are accurately flat and they are inserted in the channel in such a way as to provide a channel of uniformly progressive depth, conveniently ranging from zero at the left-hand end of FIG. 1 to a depth of .25 mm. at the right-hand end of FIG. 1.

The upper face 7 may be bounded by bevelled faces 12 along the longer sides which faces may be suitably graduated and marked as indicated at 13 in units representing the depth of the channel at different points in any suitable units, for example microns. If desired one such set of graduations may be calibrated in relation to the length of the channel.

Various forms of construction may be adopted, for example the base of the channel 8 formed in the block 6 may be ground to a progressively increasing depth and strips 10, 11 of uniform thickness may be secured to the base of said channel by means of a suitable adhesive. Alternatively, the depth of the channel 8 may be uniform and the strips 10 and 11 may be of progressively increasing thickness. In a still further alternative the depth of the channel 8 may be uniform and the thickness of the strips 10, 11 may also be uniform but secured in the channel by being bedded on to a suitable adhesive material in such a way as to provide the required configuration of the channel formed by the upper faces of the strips 10 and 11, that is varying from zero thickness at one end to a definite known thickness, e.g. .25 mm., at the other end. All these forms of the invention are represented by FIGS. 1 and 2 as will be immediately apparent.

In an alternative construction the base surface of the channel is covered by an inclined layer of transparent material, for example glass, having accurately finished plane surfaces, the lower surface being provided with the zones of contrasting appearance. Such zones may be constituted for example by a black strip and a white strip extending lengthwise of the channel, or such zones may be disposed in the manner of a checker pattern. In this case the source of reference illumination should be suitably placed to avoid anomalous results due to stray reflections.

It should, however, be understood that the present invention is not limited to the channel varying from zero at one end to a definite known value at the other end since in many cases measurement at values approaching zero thickness will not be required. The depth of the channel may then conveniently vary from, for example, .025 mm. to .25 mm. thus giving a more open graduation scale.

Conveniently, the elongated block 6 is housed in a suitable protective casing 14, for example of wood provided with a detachable cover in conventional matter. This cover may include a suitable holder for a straight edge adapted for the spreading of the liquid material within the channel. The body part of the casing 14 may then be designed as shown in FIG. 1 so as to expose the bevelled edges 12 but to surround and protect the lower part of the block 6, and, of course, the cover may be provided with operating instructions as well as any calibration charts that may be necessary.

In use a small quantity of the material to be tested is placed in the deep end of the channel, a sufficient amount being used to stand above the level of the upper surface 7. This portion of material is then spread along the channel by means of a straight-edge resting on and drawn over the surface 7 so as to spread the material across the width and also lengthwise of the channel; any surplus being carried away by the straight edge. It will, of course, be understood that only a very small quantity of material is required for this test so that in preparing an experimental mixture of components the amount abstracted for performing a test is not sufficient to alter substantially the total amount of material in the mix.

After the material has been spread along the channel, inspection of the channel under constant reference lighting conditions will enable the user to perceive the point at which the contrast or distinction between the light and dark strips 10, 11 becomes insignificant, and this point can be read off one or both of the scales 13 indicating the thickness of the layer at which some required degree of opacity is attained, and, of course, the scales 13 can be suitably co-related with the properties of the layer. After one test has been made the apparatus can be easily cleaned off ready for further tests.

The light and dark strips 10 and 11 may be formed of any suitable material, for example they may be formed of different metals or they may be formed of opaque glass products such as the materials sold under the Trademark "Vitrolite."

FIGS. 3 and 4 illustrate a modification of the invention in which in place of forming a channel in a block 6, the gauge as a whole is formed by the assembly of metal edging strips 61, 62 for example of stainless steel, with contrastingly coloured strips 10 and 11 similar to the strips 10, 11 of FIG. 1 but in which such strips are of approximately the same thickness as the metal strips 61, 62. The upper faces of the strips 10, 11 are suitably sloped to provide the progressively increasing channel depth as indicated also on FIG. 4 at an intermediate section point of the gauge. The several component strips 61, 62, 10, 11 may be held in assembly in any convenient manner, for example by means of adhesives. In some cases suitable transverse pins or screws 64 may be used. As indicated in FIG. 3 the strips 10, 11 may be shorter than the strips 61, 62 to form a terminal recess filled by a block or plug 63, the strips 61, 62 and the end plugs 63 forming a complete framework and providing a structure similar to the block 6 shown in FIGS. 1 and 2.

The block 6 in FIGS. 1 and 2 and the strips 61, 62 of FIGS. 3 and 4, as well as the end block 63 are conveniently formed from a wear-resistant and preferably stainless material such as stainless steel and if a relatively soft material is employed such material should be case hardened. All the main surfaces of the said block or of the strips should be ground to high accuracy and similarly the strips 10 and 11 should be finished at least on the upper face by grinding.

What I claim is:

1. A method for testing the opacity of spreadable materials, comprising distributing a sample quantity of such material to progressively decreasing depth in a flat open inclined channel the base of which has zones of highly contrasting chromatic or achromatic colors disposed lengthwise thereof, spreading the sample in the open channel, visually inspecting the sample without any contact with the exposed surface of said sample, and noting the depth of the channel at which the distinction between the appearance of the contrasting zones becomes insignificant under reference illumination conditions, said depth representing the opacity of said sample.

2. Apparatus for testing the opacity of spreadable materials comprising a gauge body having a surface part bounding a flat open inclined channel of progressively varying depth, the base of which channel includes surfaces of highly contrasting chromatic or achromatic colors disposed lengthwise thereof so that a portion of material spread into said channel by spreader means engaging said surface part provides a progressively varying depth of said material and the position along the gauge body at which there is insignificant distinction between said contrasting surfaces is representative of the thickness of the coated layer at that point and of said opacity.

3. Apparatus according to claim 2, wherein the gauge body is formed of hard metal for the parts surrounding the channel and base parts of said channel of said contrasting surfaces are formed by opaque glass material, the upper faces of said glass material forming the base of the channel being ground to be accurately flat and in a common plane and the upper faces of the gauge body being also ground and disposed in a plane slightly inclined to the plane containing the upper faces of the strips to provide a channel configuration of progressively increasing depth.

4. Apparatus according to claim 3, wherein the depth of the channel varies progressively from zero at one end of the gauge body to a figure of the order of .25 mm at the other end.

5. Apparatus according to claim 3, wherein the depth of the channel varies from a predetermined small finite value at one end to another predetermined but greater value at the other end.

References Cited

UNITED STATES PATENTS

| | | |
|---|---|---|
| 1,408,075 | 9/1923 | Pfund. |
| 1,875,133 | 8/1932 | Pfund. |
| 1,878,847 | 9/1932 | Hausser et al. |

OTHER REFERENCES

"Physical Test Bull., 1964" Gardner Laboratory, Inc., Bethesda, Md., 2 pp. (cover and p. 26).

"Paint Testing Manual—Paints, Varnishes, Lacquers and Colors," Gardner & Sward, 12th Ed. March 1962, pub. by Gardner Lab., Inc., Bethesda, Md., pp. 60–61, 243–4.

"Paint Flow & Pigment Dispersion," Patton, Interscience Publishers, N.Y., 1964, pp. 204–211.

JEWELL H. PEDERSEN, Primary Examiner

R. J. WEBSTER, Assistant Examiner

U.S. Cl. X.R.

356—246; 73—150